United States Patent [19]

Billini

[11] Patent Number: 4,856,376
[45] Date of Patent: Aug. 15, 1989

[54] GEARING FOR MULTIPLE-USE BICYCLES

[76] Inventor: Francisco X. Billini, Inversiones Don Eduardo S.A., Av. Francisco de Miranda, Edf. Galipan, Piso 1, Entrada C-1-C, Caracas, Venezuela

[21] Appl. No.: 109,203

[22] Filed: Oct. 16, 1987

[51] Int. Cl.⁴ ............................................. F16H 3/44
[52] U.S. Cl. ..................................... 74/750 B; 74/801; 280/260
[58] Field of Search ...................... 74/750 B, 789, 801; 280/260, 236

[56] References Cited

U.S. PATENT DOCUMENTS

| 1,411,548 | 4/1922 | Yamamoto | 74/750 B |
| 1,998,376 | 4/1935 | Lundgvist | 74/789 |
| 2,392,250 | 1/1946 | Lucas | 74/750 B |
| 2,795,970 | 6/1957 | Kollmann et al. | 74/750 B |
| 4,644,828 | 2/1987 | Kozakae | 74/750 B |
| 4,721,015 | 1/1988 | Hartmann | 74/750 B |

FOREIGN PATENT DOCUMENTS

| 0048641 | 3/1986 | Japan | 74/801 |
| 17382 | 7/1898 | Switzerland | 280/260 |
| 0638146 | 9/1983 | Switzerland | 280/260 |
| 16511 | of 1896 | United Kingdom | 74/801 |
| 3510 | of 1898 | United Kingdom | 74/801 |
| 8340 | of 1900 | United Kingdom | 74/801 |
| 24962 | of 1909 | United Kingdom | 74/801 |

Primary Examiner—Dirk Wright
Attorney, Agent, or Firm—Browdy and Neimark

[57] ABSTRACT

A gearing for attachment to a bicycle which multiplies the revolutions of the main tie rod shaft for each pedal turn through the use of a central shaft connected to the pedals which engages primary sprockets which engage secondary sprockets which in turn engage the internal teeth of a sprocket crown, whose external teeth operate a chain to a rear wheel sprocket.

13 Claims, 5 Drawing Sheets

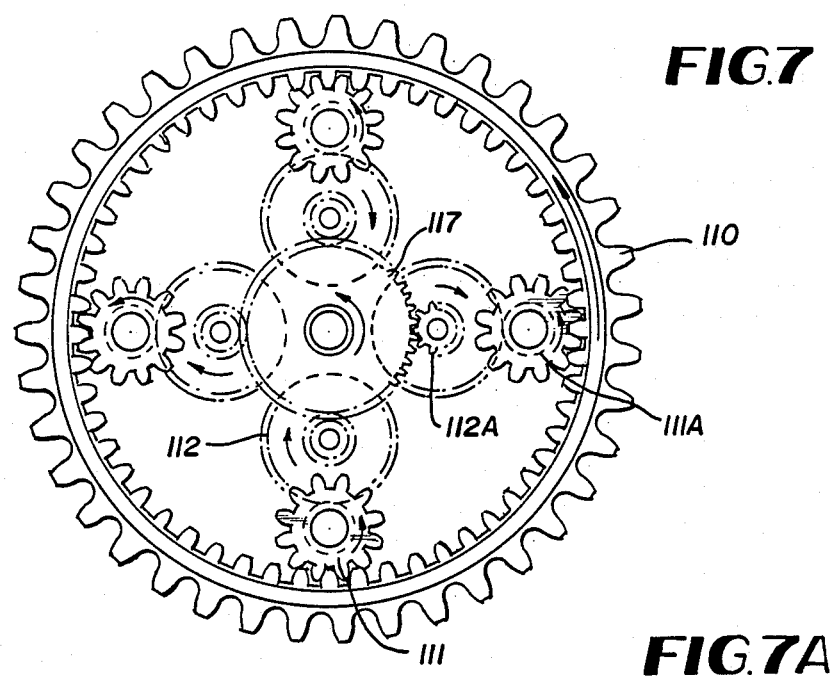
FIG.7
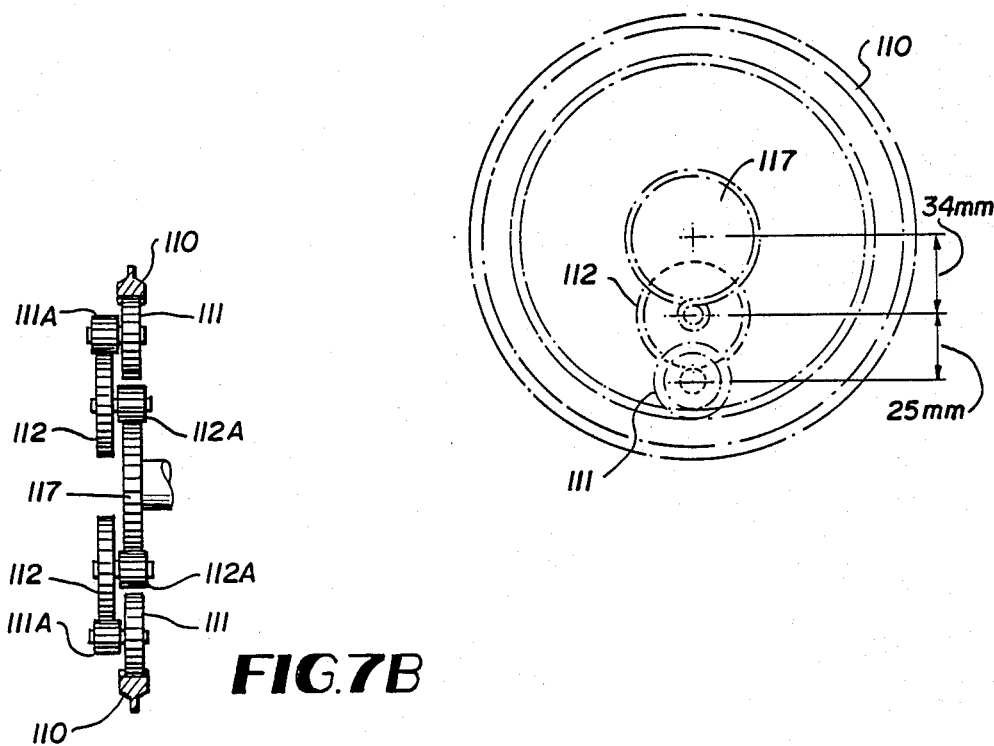
FIG.7A
FIG.7B

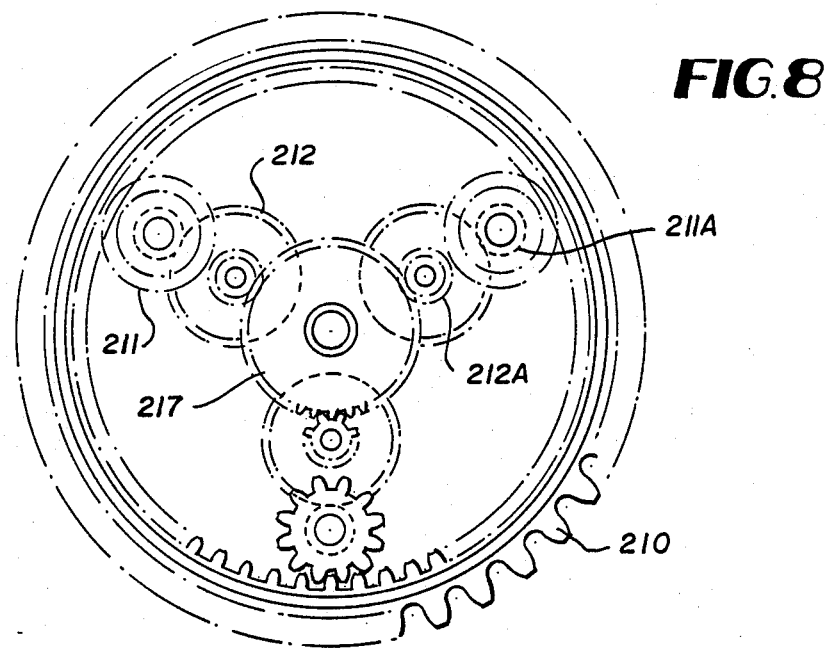
FIG.8
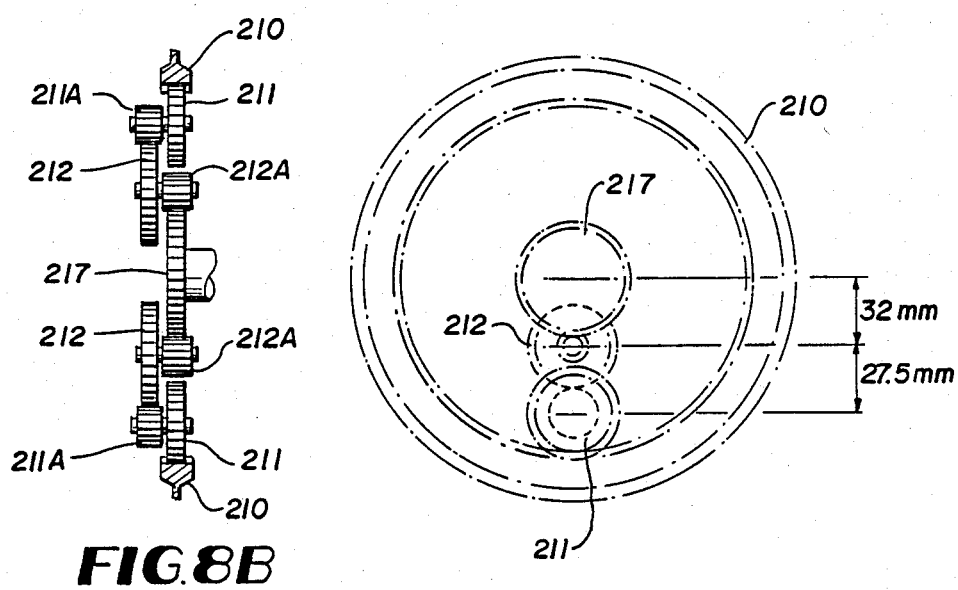
FIG.8A
FIG.8B

FIG.9
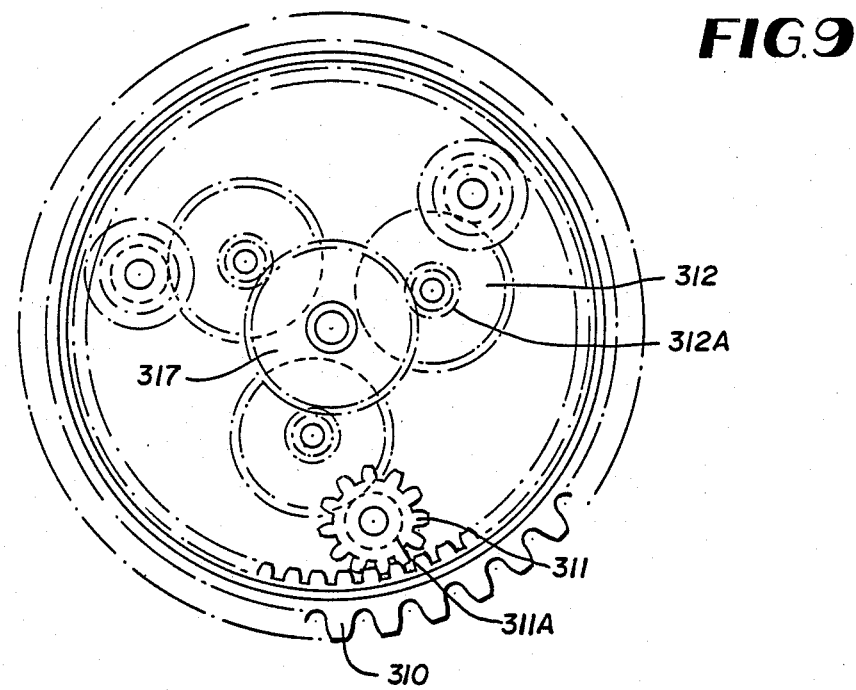
FIG.9A
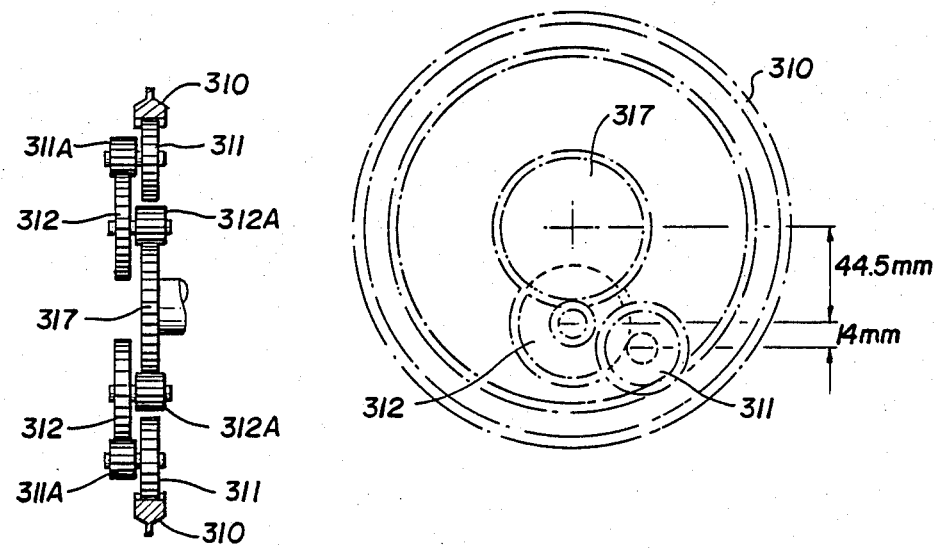
FIG.9B

4,856,376

GEARING FOR MULTIPLE-USE BICYCLES

FIELD OF THE INVENTION

The present invention relates to a mechanical device which can be used on all types of bicycles which is a gearing which multiplies the revolutions of the command shaft for each pedal turn, and transmits through a chain to a rear sprocket the revolutions obtained, which in turn, multiplies them by the revolution factor of the exchange sprocket or sprockets of the rear wheel of the bicycle.

BACKGROUND OF THE INVENTION

The bicycle since the year of its initiation which is 1818, has been a vehicle moved by a mechanical system which transmits the muscular force of a person through a pedal towards the sprocket or sprockets of the rear wheel, causing the movement of the vehicle.

The development of the bicycle has been with the relationship between the number of teeth of the wheel, of the pedals and of the sprocket, which can vary between 1:2 and 1:4 by means of a proper change of gears.

Up to now the motive power in bicycles has changed very little. In the racing bicycle, on the toothed crown wheel of the pedal plate, a smaller crown has been coupled in a manner to achieve a greater smoothness in the pedalling. The development of the motive force in a bicycle has been in the relationship between the number of teeth of the crown wheel of the pedal plate, and those of the sprocket of the rear wheel, which can varied between 1:2 and 1:4 turns by means of a proper change of gears, this being the form in general use up to now.

On bicycles now on the market, whether they are geared or not, the command shaft has a sprocket mounted thereon which generally varies only in its diameter size and the number of teeth thereon. A greater diameter gives greater thrust speed; a smaller diameter gives less thrust speed but pedalling is smoother. With respect to the teeth, a greater number of teeth reduces the pedalling speed, but the force is greater; with a smaller number of teeth, the speed as well as the force are smaller. On racing bicycles presently on the market, a smaller size sprocket is added to the command sprocket where the number of teeth can be varied to give the bicycle greater or less speed, and greater or less force, according to the needs of the cyclist. This is the conventional structure as found on the market up to the present time.

SUMMARY OF THE INVENTION

In the present invention, the internal structure of the command sprocket is changed while maintaining the external structure of the form of conventional systems.

Furthermore, the internal structure of the command sprocket has been changed in order to fulfill functions of variation of speed and pedalling power.

The structure of the present invention permits a variation of two or more turns for each pedal turn of the command shaft and sprocket.

BRIEF DESCRIPTION OF THE DRAWINGS

The foregoing and other advantages of the invention may best be apparent by reference to the accompanying drawings in accordance with the following detailed description in which:

FIG. 4 is a side view of a thrust bearing from FIG. 2; No. 10 in

FIG. 7 is side view of the pedal connected gears in a first embodiment of the present invention;

FIG. 7A is a diagrammatic view of the gearing of FIG. 7;

FIG. 7B is a frontal view of the gearing of FIG. 7;

FIG. 8 is side view of the pedal connected gears in a second embodiment of the present invention;

FIG. 8A is a diagrammatic view of the gearing of FIG. 8;

FIG. 8B is a frontal view of the gearing of FIG. 8;

FIG. 9 is side view of the pedal connected gears in a third embodiment of the present invention;

FIG. 9A is a diagrammatic view of the gearing of FIG. 9; and

FIG. 9B is a frontal view of the gearing of FIG. 9.

FIG. 10 shows the gear relationship for the 1:3 system; and

FIG. 11 indicates the numbers and identification for the gears in reference to the Appendix.

DETAILED DESCRIPTION OF THE PREFERRED EMBODIMENTS

Figure 1:
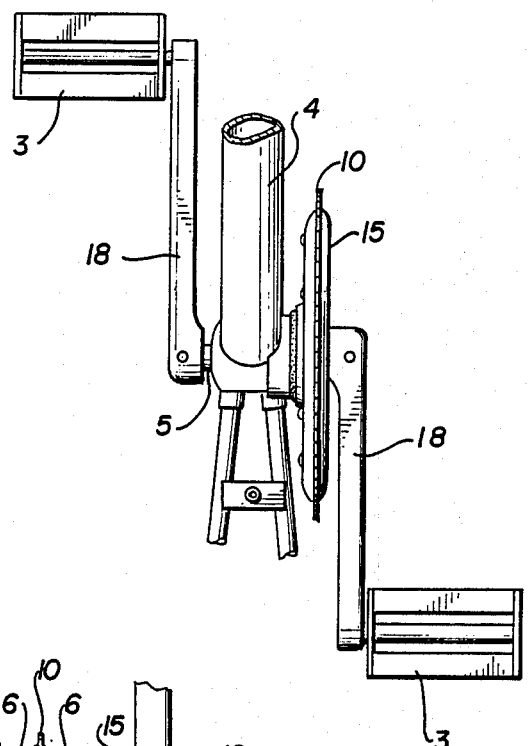
FIG. 1 is a perspective front view of the gear container of the present invention at the pedals of a bicycle.
Figure 2:
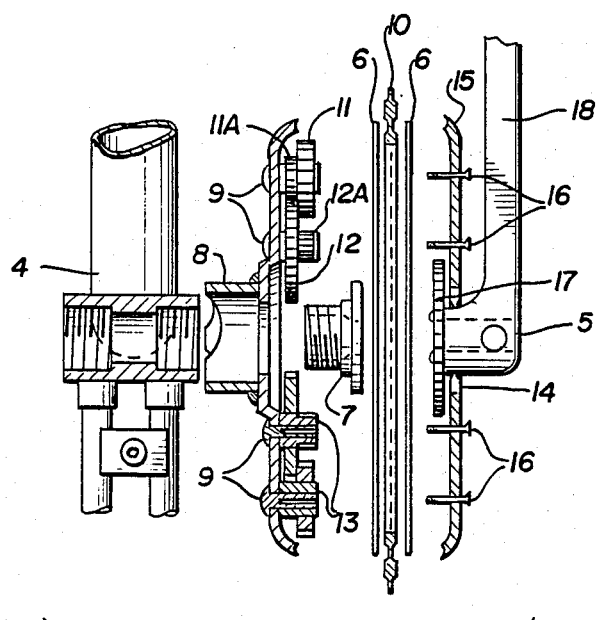
FIG. 2 is an exploded view of the internal parts of the gear container and connections to the pedals of the structure of FIG. 1.
Figure 3:
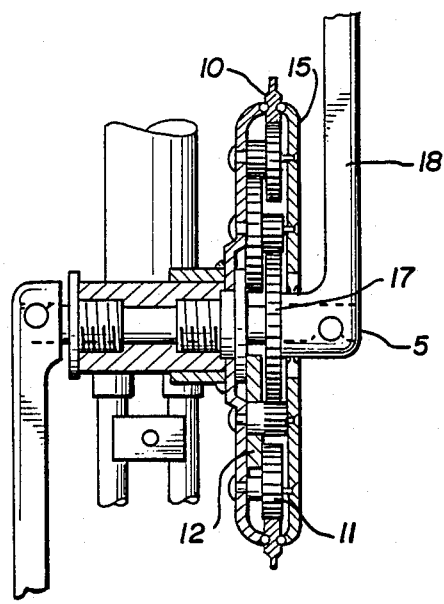
FIG. 3 is an assembled partially sectioned view of the internal parts structure in FIG. 2.
Figure 6:
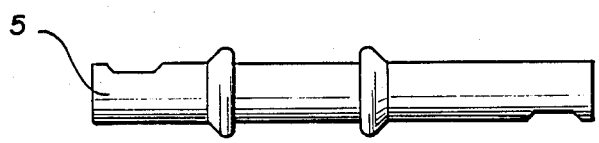
FIG. 6 is a front view of a main tie rod shaft; this tie rod is bigger than the normal one on a bicycle.

Referring to FIGS. 1, 2, and 3 there is shown respectively therein in perspective, exploded, and partial sectioned views the mounting of the gearing of the present invention on a bicycle in conjunction with pedals 3 on connecting rods 18 with the ends of connecting rods 18 on the opposite ends from pedals 3 connected to rotate main tie rod shaft 5, shown separately in FIG. 6, which rotates in the structure of primary shaft base 4. Mounted on main tie rod shaft 5 by means of stuffing box 14, in order to avoid the escape of grease or oil, and held to main base 8 by cover adjustment screws 16 extended into support rivets 9, is gear cover 15 under which is the gearing of the present invention illustrated in several embodiments in FIGS. 7, 7A, 7B; 8, 8A, 8B; and 9, 9A, 9B. Support rivets 9, by their connection to cover adjustment screws 16 connect gear cover 15 and thrust bearings 6 to main base 8, into which extends main base support bolt 7, where main base 8 is connected to primary shaft base 4. The main tie rod shaft 5 is coupled to the connecting rod 18 with central shaft 17 attached to rotate with main tie rod shaft 5. Connecting rod 18 with central shaft 17 are adjusted with cover 15, which in turn adjusts the sprocket crown 10.

As central shaft 17 is rotated by movement of main tie rod shaft 5, rotated by pedals 3 through connecting rods 18, the external teeth around central shaft 17 engage with gears 12A supported on inner concentric bearings 13, causing primary sprockets 12 connected thereto to rotate. Sprockets 12 in their rotation engage with gears 11A and cause rotation of secondary sprockets 11 whose teeth engage the internal teeth of sprocket crown 10 causing sprocket crown 10 to rotate. Sprocket crown 10 rotates and a belt (not shown) is moved by its external teeth and causes a sprocket mounted to rotate the rear wheel of the bicycle to rotate and drive the bicycle with a still different gear ratio as previously discussed for the conventional bicycle. Before this last mentioned gear ratio there are the gear ratios set up by the mechanism under gear cover 15, of the present invention.

Further in regard to the above gearing system, the individual parts are further described herein.

The main tie rod shaft 5, as shown separately in FIG. 6, is in the bottom part of the frame at the primary shaft base 4 where the pedals 3 are connected by connecting rods 18 and which are used by gearing to make the toothed sprocket crown 10 rotate, to which is geared the sprocket chain which turns a sprocket on the rear wheel. The tie rod shaft 5 used here is bigger than such a shaft used on a conventional bicycle.

Figure 4:
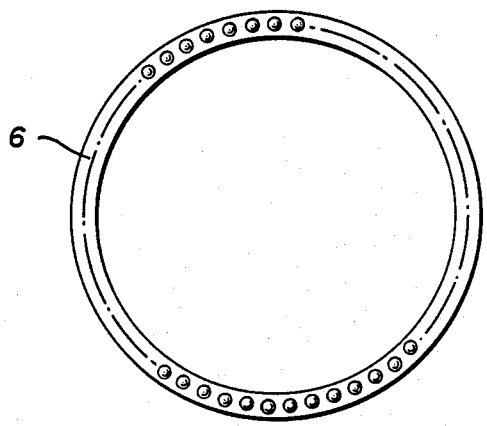
Figure 5:
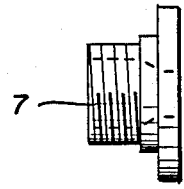
FIGS. 5A and 5B are front and side views respectively of a main base support bolt.
Figure 5B:
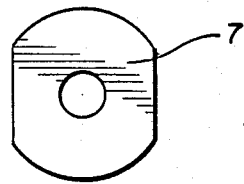

Thrust bearings 6, shown separately in FIG. 4, work directly between the cover 15 and the sprocket crown 10, and between sprocket crown 10 and main base 8 forming a cover on the opposite side of the gearing, and are ball bearings embedded in a die-cut and punched sheet, the cover 15 and base 8, as well as sprocket crown 10 having their guide slots which shoe the ball bearings perfectly. In this manner a perfect fit and good sliding motion is obtained to obtain less resistance to sprocket movement.

Main base support bolt 7 is bigger than the normal such type of bolt found on a conventional bicycle since it not only adjusts the guide shaft but also supports and adjusts the main base 8 of the gearing system. This base 8 is very easy to install on the bicycle. It is made of two die-cut and welded pieces. The rivets 9 enter tightly in order to avoid movement and friction between each other.

These rivets 9 are steel tipped for greater strength. They can also be made of aluminum, duraluminum, plastic, and other light materials having high strength characteristics. Rivets 9 also support bearings 13 in the gears and also adjust sprocket crown 10 through cover 15 which is adjusted with cover adjustment screws 16 which also are steel tipped to hold the cover 15 firmly. Bearings 13 may be graphited caps or caps of plastic material or other highly resistant material.

The sprockets 11 and 12 and sprocket crown 10 vary in size depending on number of teeth and diameter of sprocket crown 10 according to diameter which also determines external and internal teeth. Three embodiments showing different such combinations are illustrated in the figures.

FIGS. 7, 7A, and 7B illustrate one specific embodiment with the central shaft and sprockets in the shape of a cross. Central shaft 117 has 123 teeth around its periphery. These teeth of central shaft 117 contact the gears 112A, each having 22 teeth around their periphery, which are attached to each of four primary sprockets 112 spaced around central shaft 117, each of the primary sprockets 112 having 96 teeth around its periphery. Each of the primary sprockets 112 engages a gear 111A on a secondary sprocket 111 having 33 teeth on each gear 111A and 9 teeth on the periphery of each secondary sprocket 111. Sprocket crown 110 has 42 internal teeth which are engaged by the teeth of the secondary sprockets 111 and has 48 external teeth on which the sprocket chain will ride and connect to the sprocket on the rear wheel of the bicycle.

The placement of the shafts and sprockets in this embodiment in the form of a cross has a special effect since the four primary sprockets 112 are smaller than the four secondary sprockets 111, and thus the pedals will slide smoother. Four revolutions of central shaft 117 are produced for each turn of the pedal by the cyclist, which multiplies by four the number of turns of the wheel of a bicycle. The rear change sprocket plays a very determinant role since in order to start the bicycle the change has to be put very smoothly since the effect is like an automobile which has to be started in first gear. Thus in the bicycle, the greater the number of turns in the central shaft 117, the smoother the change required to start.

FIGS. 8, 8A, and 8B illustrate a second specific embodiment with the central shaft and sprockets in the form of a triangle. In this case central shaft 217 has 108 teeth around its periphery, with three primary sprockets 212 having gears 212A each with 22 teeth engaged with the teeth of central shaft 217 and with 86 teeth on primary sprocket 212 engaging with the 33 teeth on each of the three gears 211A formed with secondary sprockets 211 each with 10 teeth positioned to engage with the 42 internal teeth of sprocket crown 210, whose 48 external teeth carry the sprocket chain which connects the rear wheel sprocket.

The placement of shafts and sprockets in this embodiment in the shape of a triangle or Y has an effect because of the three primary sprockets being smaller than the three secondary sprockets whereby the pedal slides smoother and there are three revolutions of the central shaft for each turn of the pedal of the cyclist, which multiplies by three the number of turns of the wheel of the bicycle. With this system, having less number of turns, it is possible to start on the bicycle with a normal gear and with an intermediate speed, the same as with a system with two revolutions.

FIGS. 9, 9A, and 9B illustrate a third specific embodiment with the placement of the shaft and sprockets in the form of a somewhat irregular triangle. In this case the central shaft 317 has 140 teeth around its periphery, with three primary sprockets 312 having gears 312A each with 35 teeth engaged with the teeth of central shaft 317 and with 108 teeth on primary sprocket 312 engaging with the 22 teeth on each of the three gears 311A formed with secondary sprockets 311 each with 10 teeth positioned to engage with the 45 internal teeth of sprocket crown 310, whose 48 external teeth carry the sprocket chain which connects the rear wheel sprocket.

This distribution in the form of an irregular triangle gives great versatility since the three primary sprockets 312 are smaller than the three secondary sprockets 311 which makes the pedal 3 of the bicycle slide smoothly with five revolutions of the central shaft for each turn of pedal 3 by the cyclist, which multiplies by five the number of turns of the wheels of the bicycle. This multiplier factor of the number of turns of the wheel, adds to the multiplier factor of the speed-change sprocket of the rear wheel of a conventional bicycle.

As can be seen, it is essential in the present invention to establish a proper proportion between the diameter of the crown and the primary sprockets and the number of teeth of these sprockets and their associated gears, equally varying the secondary sprockets and their associated gears in size and number of teeth.

It is also feasible to combine the 1:2 system with the 1:3, 1:4, 1:5, and 1:6 ratios and thus achieve a change system of direct force in the pedal in order to obtain greater force on very inclined uphills and downhills without the cyclist having to exert great effort.

As an example, the mathematical calculation for the 1:3 system, as illustrated in FIGS. 8, 8A, and 8B, is presented in which the relationship of speed in conformity with the present invention is established.

CALCULATION SHEET FOR SYSTEM 1:3

RELATIONSHIP OF SPEED

The gears are disposed in the manner shown in FIG. 10 where the numbers indicate the number of teeth.

$$Z \times N = Z' \times N'$$

Where Z and Z', are the number of teeth of the driver and driven gears respectively. Where N and N', are the angular velocities in rev./min. of the driver and driven gears respectively. Suppose 1 rev./min.

SOLAR WHEEL   $Z = 108$   $N = 1$ rev./min.
              $Z' = 22$    $N' = X$ $$N' = \frac{Z \times N}{Z'} = \frac{108 \times 1}{22} = 4.91 \text{ rev./min.}$$

This speed is equal for the planetary gear of 86 teeth since the 22 teeth sprocket is coupled to it.

PLANETARY WHEEL   $Z = 86$   $N = 4.91$ rev./min.
                  $Z' = 33$   $N' = X$ $$N' = \frac{Z \times N}{Z'} = \frac{86 \times 4.91}{33} = 12.80 \text{ rev./min.}$$

This speed is equal for the teeth of the next engaged planetary gear since the 33 teeth sprocket is coupled to it.

PLANETARY WHEEL   $Z = 10$   $N = 12.80$ rev./min.
Gear Exit         $Z' = 42$   $N' = X$ $$N = \frac{Z \times N}{Z'} = \frac{10 \times 12.80}{42} = 3.05 \text{ rev./min.} =$$

3 revolutions per minute

These calculations verify that for an entrance of "N" turns, an exit of "N"×3 turns is obtained.

Procedures can be set up to establish the preliminary or tentative design of the gears, but in the case of the majority of the machine designs, the final design will depend on laboratory tests and the tests of the gears functioning under actual operating conditions. Such gears should be designed in accordance with the structure of the present invention, examples of which have been given, all of which conform to a basic structure as claimed to so define the present invention.

The present invention has been described with reference to examples of preferred embodiments but numerous modifications can be made within the scope of the invention.

APPENDIX A TO APPLICATION

CALCULATION SHEETS
CALCULATIONS REGARDING GEARING:

Hereinafter the gear will be numbered and identified as FIG. 11 indicates.
Note: For nomenclature used in FIG. 11, see end of text.
CALCULATIONS FOR GEARS 1 and 2
(normal module system).
For reasons of space, the modules of these gears will be equal to

APPENDIX A TO APPLICATION-continued
CALCULATION SHEETS
CALCULATIONS REGARDING GEARING:

1.25.
WHEEL 1
M = 1.25
P = M × π = 1.25 × 3.1416 = 3.927 mm
Dp = M × Z = 1.25 × 5.4 = 67.5 mm
De = M × (Z + 2) = 1.25 × (54 + 2) = 70 mm
Di = Dp −(2 × M × 1.167) =
                  67.5 − (2 × 1.25 × 1.167) = 64.5825 mm
C = P/2 = 3.927/2 = 1.963 mm
e = P/2 = 3.927/2 = 1.963 mm
h = M × 2,167 = 2,70875 mm
L = M = 1,25 mm
l = M × 1,167 = 1,45875 mm
R = 0,3 × M = 0,3 × 1,25 =0,375 mm (Max)
R = 0,3 × M           0,3 × 1 = 0,3 mm (Max)
R = c/6                1,5707/6 = 0,2617 mm (Min)
WHEEL 2
M = 1,25
P = M × T = 1,25 × 3,1416 = 3,9269 mm
Dp = M × Z = 1,25 × 11 = 13,75 mm
De = M × (Z'2) = 1,25 × 11 + 2) = 16,25 mm
Di = Dp-(2 × M × 1,167) ×
                  13,75 − (2 × 1,25 × 1,167) = 10,8325 mm
C = P/2 = 1,9634 mm
e = P/2 = 1,9634 mm
h = M × 2,167 = 2,70875 mm
L = M = 1,25
l = M × 1,167 = 1,45875 mm
R = 0,3 × M = 0,375 mm (Max)
R = c/6 = 0,3272 mm Min)
Distances between centers or shafts (Wheels 1 and 2)

$$A = \frac{Z \times Z'}{Z} \times M = \frac{54 + 11}{2} \times 1,25 = 40,625 \text{ mm}$$

CALCULATIONS FOR GEARS 3 and 4
(normal module system)
Wheel 3 (coupled to Wheel 2).
M = 1
P = M × T                 1 ×3,1416 = 3,1416 mm
Dp = M × Z               1 × 43 = 43 mm
De = M × (Z = Z)       1 × (43 = 2) = 45 mm
Di = Dp −(2 × M × 1,167)  43 − (2 × 1 × 1,167) = 40,66 mm
C = P/2                  3,1416/2 = 1,5707 mm
e = P/2                  3,1416/2 = 1,5707 mm
h = M × 2,167            1 × 2,167 = 2,167 mm
L = M                   1 mm
l = M × 1,167            1 × 1,167 mm
R = 0,3 ×M             0,3 × 1 =0,3 mm (Max)
R = c/6                  1,5707/6 = 0,2617 mm (Min)
WHEEL 4
M = 1
P = M ×T                 1 × 3,1416 = 3,1416 mm
Dp = M ×Z               1 ×17 = 17 mm
De = M × (Z + 2)        1 × (17 + 2) = 19 mm
DI = Dp − (2 × M × 1,167)  17 −(2 × 1 × 1,167) = 14,66 mm
C = P/2                  3, 1416/2 = 1,5707 mm
e = P/2                  3,1416/2 = 1,5707 mm
h = M × 2,167            1, × 2,167 = 2,167 mm
L = M                   1 mm
l = M × 1,167            1 × 1,167 = 1,167 mm
R = 0,3 × M             0,3 × 1 = 0,3 mm (Max)
R = c/6                  1,5707/6 = 0,2617 mm (Min)
DISTANCES BETWEEN CENTERS AND SHAFTS
(WHEELS 3 AND 4).

$$A = \frac{Z \times Z'}{Z} \times M = \frac{43 + 17}{2} \times 1 = 30 \text{ mm}$$

Calculations for gears 5 and 6 (normal module system).
WHEEL 5 (Coupled to wheel 4)
Is determined in the shop.
WHEEL 6 (solidary to the crown for the tractor chain)
Is determined according to the sample to modify
M = MODULE
P = LINEAR PACE
Dp = PRIMITIVE DIAMETER
De = EXTERIOR DIAMETER APPENDIX A TO APPLICATION-continued
CALCULATION SHEETS
CALCULATIONS REGARDING GEARING:

Di = INTERIOR DIAMETER
h = HEIGHT OF TEETH
R = RADIUS IN THE BACKGROUND
The preceeding procedures establish the preliminary or tentative design of the gear, but in the case of the majority of the machine designs, the final design will depend on laboratory tests and the tests of the gears functioning at the real operation conditions. These calculations are performed on a 1:3 system in order to show mathematically that this system is functional from a theoretical point of view.

I claim:
1. Gearing for a bicycle having connection to pedals or such motive power and to a chain for connection to a rear wheel sprocket on a rear wheel comprising
a main tie rod shaft connected to the pedals;
a central shaft mounted on said main tie rod shaft and including
central shaft external teeth on the periphery of said central shaft;
a plurality of primary prockets having teeth spaced around the periphery of each of said primary sprockets and said primary sprockets being spaced around said central shaft and each including
a primary sprocket gear mounted integrally to said primary sprocket and having primary gear teeth engaging with said central shaft external teeth as both said central shaft and said primary sprocket and said gear mounted thereon are rotated;
a plurality of secondary sprockets having teeth spaced around the periphery of each of said secondary sprockets, at least one of said secondary sprockets for each of said primary sprockets, with said at least one said secondary sprocket positioned adjacent a said primary sprocket and each of said secondary sprockets including
a secondary sprocket gear mounted integrally to said secondary sprocket and having secondary gear teeth engaging with a said adjacently positioned primary sprocket;
a sprocket crown having internal and external sprocket crown teeth with said internal sprocket crown teeth engaged by said secondary sprocket teeth of each of said secondary sprockets;
said external sprocket crown teeth positioned to engage the chain for connection to the rear wheel sprocket of the bicycle.
2. The gearing of claim 1 wherein
said central shaft, said primary sprockets, and said secondary sprockets are disposed with respect to each other generally in the shape of a cross.
3. The gearing of claim 1 wherein
said central shaft, said primary sprockets, and said secondary sprockets are disposed with respect to each other generally in the shape of a Y.
4. The gearing of claim 1 wherein
said central shaft, said primary sprockets, and said secondary sprockets are disposed with respect to each other generally in the shape of an irregular triangle.
5. The gearing of claim 1 including
units each having a set of said central shaft, said primary sprockets, and said secondary sprockets;
said shaft and sprockets of said units differing in shape generally of a cross, a Y, and an irregular triangle combined in order to achieve a variable speed.
6. The gearing of claim 1 wherein
said central shaft has 123 of said central shaft teeth;
said primary sprockets are four in number and have 96 primary sprocket teeth and 22 primary gear teeth;
said secondary sprockets are four in number and have 9 secondary sprocket teeth and 33 secondary gear teeth; and
said sprocket crown has 42 of said internal sprocket crown teeth and 48 of said external sprocket crown teeth;
which permits a smooth rotation of the pedal with an equivalent of four revolutions of the main tie rod shaft for one of the pedal, which multiplies by four the number of turns of the rear wheel.
7. The gearing of claim 6 further comprising a second unit wherein
said central shaft has 108 of said central shaft teeth;
said primary sprockets are three in number and have 86 primary sprocket teeth and 22 primary gear teeth;
said secondary sprockets are three in number and have 10 secondary sprocket teeth and 33 secondary gear teeth; and
said sprocket crown has 42 of said internal sprocket crown teeth and 48 of said external sprocket crown teeth;
which permits a smooth rotation of the pedal with an equivalent of three revolutions of the main tie rod shaft for one of the pedal, which multiplies by three the number of turns of the rear wheel.
8. The gearing of claim 7 further comprising a third unit wherein
said central shaft has 140 of said central shaft teeth;
said primary sprockets are three in number and have 108 primary sprocket teeth and 35 primary gear teeth;
said secondary sprockets are three in number and have 10 secondary teeth and 22 secondary gear teeth; and
said sprocket crown has 45 of said internal sprocket crown teeth and 48 of said external sprocket crown teeth;
which permits a smooth rotation of the pedal with an equivalent of five revolutions of the main tie rod shaft for one of the pedal, which multiplies by five the number of turns of the rear wheel.
9. The gearing of claim 1 wherein
said central shaft has 108 of said central shaft teeth;
said primary sprockets are three in number and have 86 primary teeth and 22 primary gear teeth;
said secondary sprockets are three in number and have 10 secondary sprocket teeth and 33 secondary gear teeth; and
said sprocket crown has 42 of said internal sprocket crown teeth and 48 of said external sprocket crown teeth;
which permits a smooth rotation of the pedal with an equivalent of three revolutions of the main tie rod shaft for one of the pedal, which multiplies by three the number of turns of the rear wheel.
10. The gearing of claim 1 wherein
said central shaft has 140 of said central shaft teeth;

said primary sprockets are three in number and have 108 primary sprocket teeth and 35 primary gear teeth;
said secondary sprockets are three in number and have 10 secondary sprocket teeth and 22 secondary gear teeth; and
said sprocket crown has 45 of said internal sprocket crown teeth and 48 of said external sprocket crown teeth;
which permits a smooth rotation of the pedal with an equivalent of five revolutions of the main tie rod shaft for one of the pedal, which multiplies by five the number of turns of the rear wheel.

11. The gearing of claim 1 further comprising
a main base attachable to a bicycle;
an opposing cover to said main base;
said primary and secondary sprockets mounted for rotation on said main base;
said sprocket crown mounted for rotation with said primary and secondary sprockets between said main base and said cover;
said cover having means therein to adjust said sprocket crown.

12. The gearing of claim 11 wherein
said main base is formed by two die-cut and welded pieces.

13. The gearing of claim 12 wherein
said main base is made of a material taken from a group consisting of aluminum, duraluminum, plastic, and a material of light weight and great strength.

* * * * *